United States Patent [19]

Rannanmaki

[11] 4,266,483
[45] May 12, 1981

[54] CONVERTIBLE RAIL-HIGHWAY CAR MOVING VEHICLE

[75] Inventor: Tapio M. Rannanmaki, Espoo, Finland

[73] Assignee: Vaino Tapio Saalasti, Helsinki, Finland

[21] Appl. No.: 65,964

[22] Filed: Aug. 13, 1979

[30] Foreign Application Priority Data

Jan. 26, 1979 [FI] Finland .................................. 790254

[51] Int. Cl.³ .................... B61D 15/00; B61F 9/00; B61F 13/00; B62D 61/12
[52] U.S. Cl. ................................ 105/26 R; 104/245; 105/26.1; 105/90 A; 105/215 C
[58] Field of Search ............... 105/26 R, 90 A, 215 C, 105/26.1; 104/245

[56] References Cited

U.S. PATENT DOCUMENTS

| 3,198,137 | 8/1965 | White, Jr. .......................... 105/26 R |
| 3,356,042 | 12/1967 | Herscovitch .................. 105/26 R X |
| 3,892,187 | 7/1975 | White, Jr. ..................... 105/215 C X |
| 3,980,025 | 9/1976 | Olson, Sr. et al. ............... 105/215 C |

*Primary Examiner*—Howard Beltran
*Attorney, Agent, or Firm*—Browdy & Neimark

[57] ABSTRACT

A convertible rail-highway car moving vehicle is constructed by a tractor having a front end and a rear end. A pair of rubber wheels, which may take the form of rubber-tired wheels is associated with the front end of the tractor. At least one pair of flanged wheels which can be raised and lowered is associated with the front end of said tractor. One further pair of flanged wheels is associated with the rear end of the tractor. One pair of upwardly and downwardly moveable rubber wheels, which may be rubber-tired wheels, is associated with the rear. During operation on rails, the front end of the tractor is raised and the rear end is lowered, while in the terrain driving mode the front end is lowered and the rear end is raised.

7 Claims, 4 Drawing Figures

CONVERTIBLE RAIL-HIGHWAY CAR MOVING VEHICLE

BACKGROUND OF THE INVENTION

This invention relates to a convertible rail-highway car moving vehicle which is provided with wheels so that it can operate over trackless surfaces as well as on tracks. More particularly, the invention is concerned with such a vehicle which can operate in relatively small spaces, in comparison with conventional shunting (switching) locomotives.

The word railway car moving vehicle is, in this patent application, understood to mean a small locomotive which is to move on rails, pulling and pushing cars; in other words, performs shunting work, and in particular in very cramped locations. The term shunting *locomotive* is not used to describe the vehicle because the term already has a fully established meaning implying that the locomotive runs on rails alone. In contrast, the car moving vehicle which is the subject of the present application performs the work of a light-weight locomotive on rails, but it is also able to shift from the tracks, to move in the shunting yard from one track over to another and to move in between cars on the track, to travel about the yard, over the terrain, on roads and the like.

Various types of car moving vehicles, capable of moving both on tracks and on rubber wheels, are known in the prior art. They may be classified by three categories:

1. Those car moving vehicles, modified in the first place from automobiles or from small tractors, with traction provided by rubber wheels. Such vehicles are provided with conventional rubber tires mounted with a lateral spacing equalling the gauge. It is thus understood that a car moving vehicle of this type moves on rails using the wheels, these rubber wheels supplying traction for the train. To ensure that the rubber wheels are held on the rails, small flanged wheels have been provided in front and in the rear of such a car moving vehicle, which take up part of the weight of the car moving vehicle and thereby keep the car moving vehicle on the rails; for example, 20 to 25% of the weight may be taken up. A car moving vehicle of this type develops a highly unsatisfactory tractive effort in rainy weather, and the tractive effort is virtually nil while it is snowing, or in snow-covered terrain. A car moving vehicle of this type in fact involves danger to its user, because it loses much of its tractive and braking effects in snow.

2. The second category of car moving vehicles consists of those in which the flanged wheels and rubber wheels are mutually parallel and the entire vehicle is raised by means of a hydraulic jack and turned through 90°. The raising operation is slow and it is not possible to lift the car moving vehicle, if of somewhat substantial weight, at all everywhere on the line.

3. The third category consists of those car moving vehicles wherein the rubber tired wheels are disposed at right angles to the rails and to the flanged wheels and the rubber wheels are lowered for the duration of travelling on the road. In this instance, thus, the flanged wheels are correspondingly raised up. In such case the foremost rubber wheels may be steerable and the rear wheels, traction wheels. Of course, the arrangement is also conceivable wherein all four wheels provide traction and the front wheels are still steerable. In this case a separate power transmission system is provided for the flanged wheels and for the rubber wheels, whereby this is a complicated and expensive design.

The designs described above are all highly complex, and since in the manufacturing of car moving vehicles the production series are small—only a few units at a time—their manufacturing is rather uneconomical.

The car moving vehicle of the present invention does not belong to any one of the three categories just mentioned and in fact can be considered to belong to a new category.

SUMMARY OF THE INVENTION

It is an object of the present invention to provide a railway car moving vehicle which can travel on rails, as well over trackless surfaces, has good traction and braking characteristics even in rainy and snowy weather, is readily changeable from one mode of operation to the other and is both uncomplicated and inexpensive to manufacture.

The foregoing object, as well as others, which are to become clear from the text below, is achieved by, in effect, modifying a conventional tractor. The railway car moving vehicle includes at the front end of tractor, in addition to the rubber wheels of the tractor, flanged wheels which can be raised and lowered. In the rear there are, in addition to the conventional rear wheels, which have been converted to flanged wheels, upwardly and downwardly moveable rubber wheels which serve as terrain wheels. While driving on rails, the front end of the tractor is raised and the rear end is lowered. In the terrain driving mode, the front end of the tractor is lowered and the rear end is raised.

The terrain wheels, when lowered for terrain driving, preferably obtain their power from the rear axle or the power transmission of the tractor.

The lowered flanged wheels in front of the car moving vehicle preferably obtain their driving power from the rubber front wheels with the aid of friction drums.

Power transmission to the terrain wheels is preferably from the rear axle of the tractor via friction drums or chains.

Power transmission to the terrain wheels is preferably from the rear power take-off of the tractor via a cardan shaft or chains.

The flanged wheels may be provided with means to effect spring action.

The spring action of the flanged wheels is preferably effected by respective resilient rubber layers between the wheel rims and their associated hubs.

BRIEF DESCRIPTION OF THE DRAWINGS

The invention is described below with reference to the accompanying drawings, without confining the invention to the specific illustrative embodiment and variants.

DETAILED DESCRIPTION OF THE PREFERRED EMBODIMENT

Figure 1:
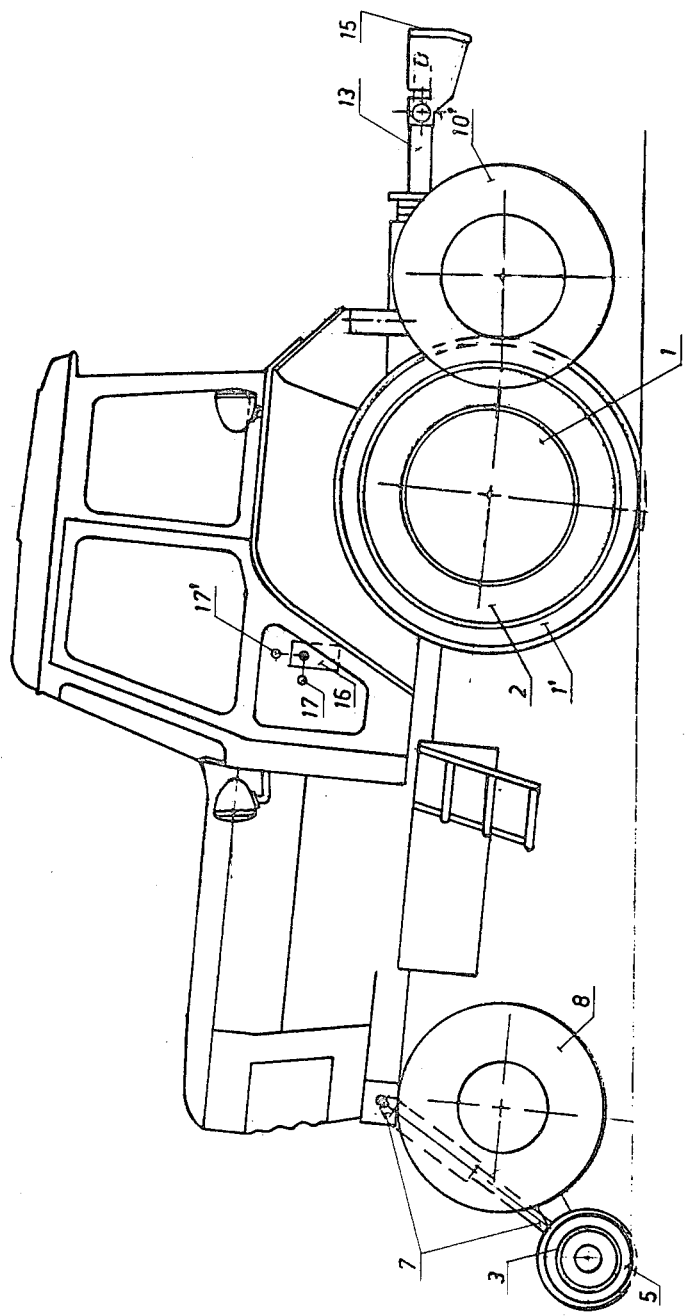
FIG. 1 is a side, elevational view of an exemplary embodiment of a car moving vehicle according to the present invention, the vehicle being shown in its track-engaging mode.

As shown in FIGS. 1-4, the exemplary embodiment of a car moving vehicle may take the form of a tractor, the conventional large rear tires of the tractor having been removed and replaced with resilient flanged wheels 1 made specifically for this purpose. Normally, the rear axle of a tractor has no spring arrangement because in an agricultural tractor spring action is provided by the pneumatic tires. In view of this, the traction-providing flanged wheel 1 of the car moving vehicle is composed of two components in such manner that a respective layer or member 3 of resilient rubber is interposed between each wheel rim 1' and its associated wheel hub 2. To each of the wheel hubs 2, mounted on the rear axle of the tractor, a respective friction drum 4 presenting a rough outer surface has been affixed.

In the front, the tractor carries an axle 6, which can be vertically raised and lowered with the aid of a hydraulic cylinder 7 maneuvered via controls from the driver's cab and on which flanged wheels 5 are mounted. When the wheels 5 are in the lowered position (FIG. 1), their flanges will keep the car moving vehicle on the rails and, at the same time, the front tires of the tractor are raised about 10-20 cm over the running surfaces of the rails. These wheels 5 are also spring-mounted in that there is a resilient layer or member 3 of rubber between respective wheel rims and their associated hubs of the wheels 5. The spring yield hereby achieved is rather slight, but it adds to the comfort of driving over rail joints and crossings.

Figure 3:
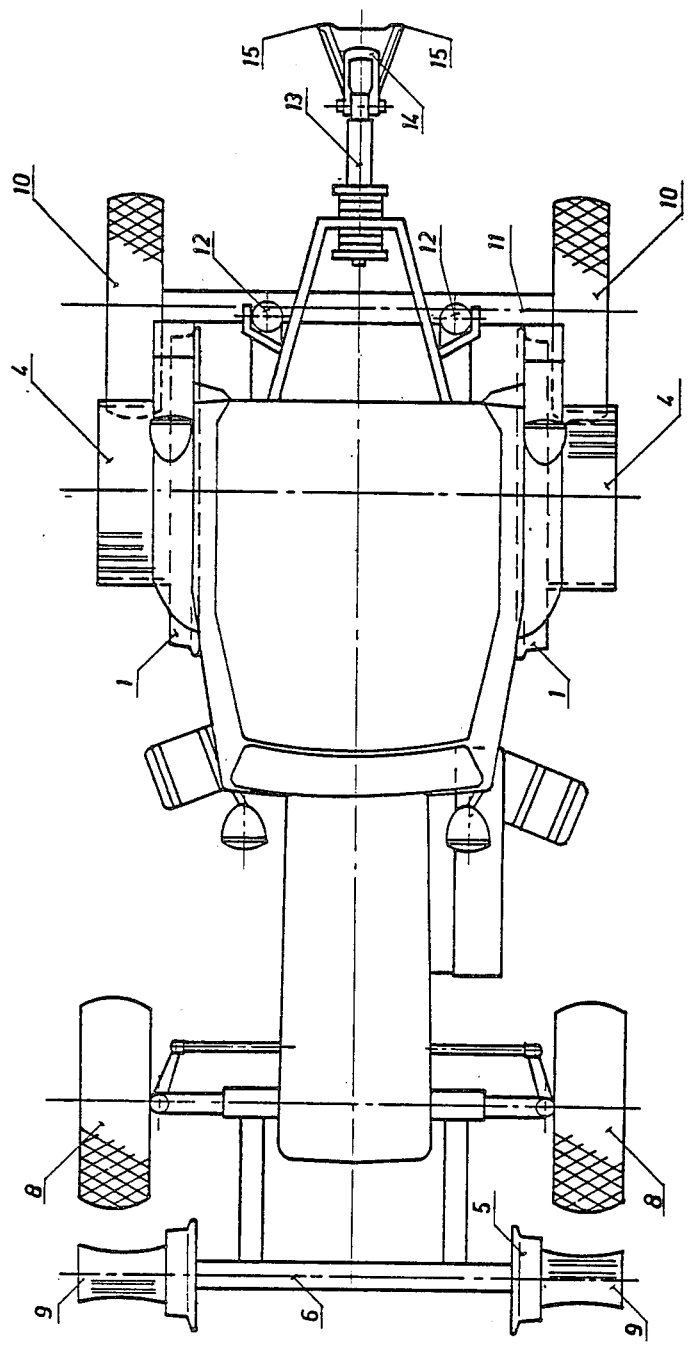
FIG. 3 is a top view of the vehicle shown in FIGS. 1 and 2.

FIG. 1 shows the car moving vehicle in elevational view, in position for driving on rails. The wheels 5 and the wheels 1 rest on the rails, and a coupling 13 shown in FIGS. 1 and 3 is on a level with the draw hooks of railway cars which are to be maneuvered. The tractor is backed up to the car whereby a yoke 14 of the coupling 13 engages with the draw hook of the car, and the car moving vehicle is to pull the car with the aid of this yoke. Pushing of a car is accomplished in that wings 15 of the coupling 13 are positioned to address the buffer beam of the car providing good contact so that the car can be effectively pushed by the vehicle.

When the car moving vehicle operates on rails, its engine, transmission and the entire power transmission of the rear axle operate substantially as they do in a conventional agricultural tractor. Naturally, the additional equipment causes the weight to be higher than what the tractor had in agricultural use, but while the friction coefficient of the rubber wheel of an agricultural tractor against earth is about 1, that of a steel wheel on tracks is about 0.3. It is consequently possible, when the tractor is used as a car moving vehicle, to increase the rear axle weight to such an extent that a tractive effort of, for example, 2.5 to 3 tons on rails is achieved, which is adequate for moving a 500 to 600 ton train within a level yard.

Figure 2:
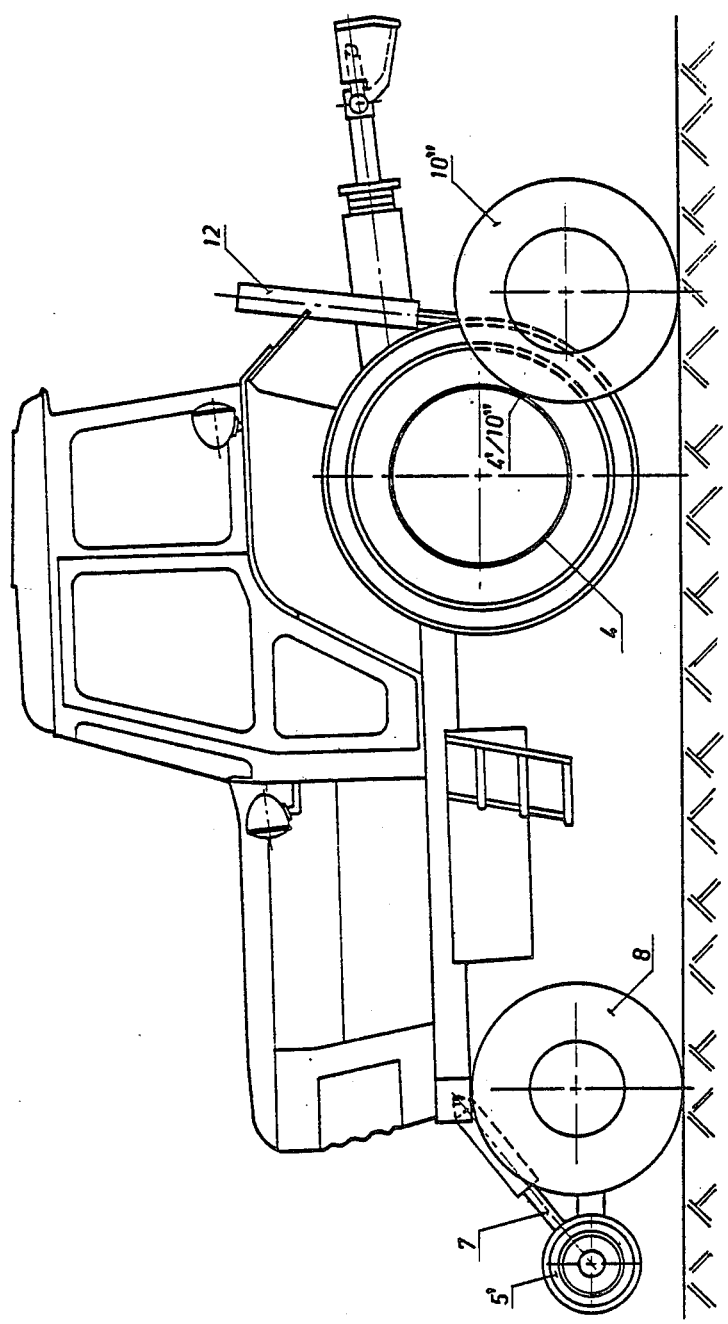
FIG. 2 is a side, elevational view of the vehicle shown in FIG. 1, the vehicle being shown in its terrain-traveling mode.

For the purpose of moving off the track and travelling over terrain, the car moving vehicle moreover, behind its rear axle, adjacent to the friction drums 4 (FIG. 3), features wheels fitted with terrain-travelling rubber tires 10 mounted on an axle 11. The axle 11 is attached to the tractor chassis with clamps so that when this axle is depressed by cylinders 12, the outer surface of the terrain tire will at the same time be pressed against a friction wheel 4 along a line designed 4'/10" (FIG. 2). Power transmission will then take place from the conventional rear axle of the tractor via the friction wheel 4 to the terrain engaging tires 10.

Driving over terrain is accomplished as the driving of a standard tractor. The steering wheel is used for steering, and the clutch, gears and brakes are conventional and are operated normally, accordingly, details are not shown. Large tractor often have torque converters. This makes the driving and gear changing very easy. When travelling over difficult terrain, across rails or on a steep incline, it is proper to engage the front wheel drive, which enables the car moving vehicle to manage even the most difficult terrain.

To move off the track, the procedure is as follows. A control valve 16 (FIG. 1) for the hydraulic system is provided in the cab of the vehicle. When a lever 17 in the cab is depressed, in the position shown in the figure, the car moving vehicle is in the track-driving mode, as shown in FIG. 1. When the lever 17 is raised into the position 17', the cylinders 12 will move the terrain tires 10 vertically downwardly from position shown in FIG. 1 to position shown in FIG. 2 to press against the friction drums 4, and at the same time the wheels 5 in front are raised to position shown in FIG. 2, that is, the tractor component proper rises in the rear aloft from the rails, and in front the front part of the tractor with its front wheels 5 is lowered. Steering in terrain driving is, as in the case of an agricultural tractor, by the wheels 8, but the car moving vehicle moves (that is, it propels itself) by the rear wheels 10 as shown in FIG. 2, and these are driven by the friction drums 4 affixed to the hubs 2 of the resilient flanged wheels 1 of the tractor.

In practice, the weight of the car moving vehicle is distributed as follows. The front wheels carry about 20%, and the rear wheels 80%, of the total weight. If it is desired, in special instances, to utilize also the 20% of the weight for tractive effort on rails, this can be accomplished by providing friction drums 9 (FIG. 3) on the outside of the front, track-engaging wheels 5. The drums 9 are mounted on axle 6 of the chassis in such manner that, when the axle 6 is lowered, these drums 9 are pressed tight against the conventional rubber tired wheels 8, which have been locked in their "straight ahead" position. Hereby, then, the wheels 5 serve as traction wheels on the rails when a four-wheel-drive tractor is used. The car moving vehicle also may operate with four-wheel drive in terrain travelling.

Figure 4:
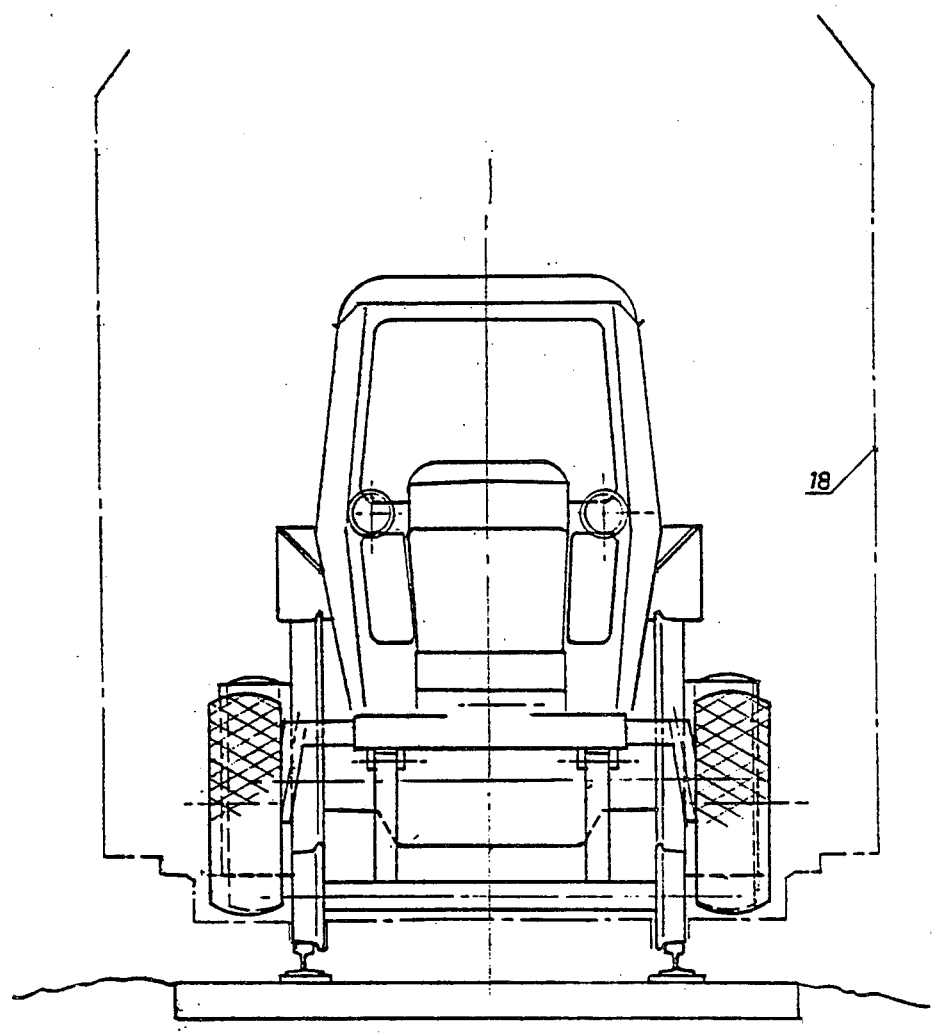
FIG. 4 is a front view of the vehicle shown in FIGS. 1-3.

In FIG. 4, the largest allowable size of railway rolling stock, i.e. the rolling-stock clearance gauge 18, has been indicated. The car moving vehicle of the present invention fits well within it.

By the present invention, with very small changes (one axle in front, one axle in the rear, and flanged wheels to replace the tractor's rear tires), the conversion of an ordinary tractor into a highly efficient car moving vehicle which can be driven over terrain has been achieved. An exceedingly great advantage has been gained by this invention. What has been done is to apply an agricultural tractor, manufactured in extensive series, by rather small modifications for use in an altogether new type of work: to replace a small shunting locomotive, and this car moving vehicle may furthermore be driven over terrain, or in the yard from one track to another, and it has access to spaces between railway cars, or it may be driven out from between the buffer stop and the cars, all of which renders its use most efficient on cramped railway yards, in harbors and industrial plants.

The foregoing and the accompanying drawing figures relate to an illustrated embodiment set out by way of example, not by way of limitation. It is to be appreciated that other embodiments and variants are possible without departing from this spirit and scope of the invention, its scope being defined in the appended claims. The term rubber wheels as used herein is to be understood to include rubber-tired wheels, including pneumatic tires or solid tires.

What is claimed is:

1. A rail-highway car moving vehicle comprising a tractor having a front end including steerable members and a rear end with a rear axle, a pair of vertically fixed rubber tired wheels connected to said steerable members of said tractor, at least one pair of flanged vertically shiftable wheels fixed to said front end of said tractor, means for raising and lowering said at least one pair front wheels from and to a lowest most position with their respective lowest circumferential point lower than the lowestmost point of the circumferences of said at least one pair of rubber tired wheels, at least one further pair of flanged wheels connected to said rear axle and driven thereby, said at least one further pair of flanged wheels being vertically fixed, at least one further pair of rubber tired wheels connected to said rear end of said tractor, said at least one pair of rubber tired wheels being vertically movable, means for raising and lowering said at least one further pair of rubber tired wheels from and to a lowestmost position with their respective lowestmost circumferential point lower than the lowestmost point of the circumferences of said at least one further pair flanged wheels, and means for supplying power to said at least one further pair of rubber tired wheels when they are in their lowestmost position, whereby while driving on rails, the front end of the tractor is raised and the rear end is lowered, while in terrain driving the front end is lowered and the rear end is raised.

2. A convertible rail-highway car moving vehicle according to claim 1, wherein said at least one pair of flanged wheels fixed to said front end of said tractor are connected to a front axle.

3. A convertible rail-highway car moving vehicle according to claim 1, wherein said means for supplying power to said at least one further pair of rubber tired wheels when lowered for terrain driving comprise means for coupling said rear axle to said further pair of rubber tired wheels.

4. A convertible rail-highway car moving vehicle according to claim 3, wherein said means for supplying power to said at least one further pair of rubber tired wheels comprise friction drums fixed to said rear axle and contacting said further pair of rubber tired wheels in a lowered position.

5. A convertible rail-highway car moving vehicle according to claim 1 or claim 3, including friction drums, and wherein said pair of flanged wheels fixed to said front end obtain driving power from said pair of rubber tired wheels connected to said steerable members via said friction drums.

6. A convertible rail-highway car moving vehicle according to claim 1 or claim 3, including means for providing resiliency for said pairs of flanged wheels.

7. A convertible rail-highway car moving vehicle according to claim 6, wherein said means for providing resiliency comprise respective resilient rubber layers between respective wheel rims and respective associated hubs of each of said flanged wheels.

* * * * *